United States Patent
King et al.

(10) Patent No.: US 7,359,448 B2
(45) Date of Patent: Apr. 15, 2008

(54) REMOTE TRANSMITTER SYSTEM AND METHOD

(75) Inventors: Ronald O. King, Brownstown, MI (US); Qingfeng Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 964 days.

(21) Appl. No.: 10/225,468

(22) Filed: Aug. 21, 2002

(65) Prior Publication Data

US 2004/0037365 A1 Feb. 26, 2004

(51) Int. Cl.
*H04L 27/02* (2006.01)
(52) U.S. Cl. .................. 375/268; 375/300; 375/376
(58) Field of Classification Search ............. 375/268, 375/346, 344, 295; 455/150.1, 179.1, 63.1, 455/67.11, 67.13
See application file for complete search history.

(56) References Cited

U.S. PATENT DOCUMENTS

| | | | |
|---|---|---|---|
| 4,387,469 A | | 6/1983 | Miyazaki et al. |
| 4,937,822 A | * | 6/1990 | Weddle et al. .............. 370/436 |
| 5,109,530 A | * | 4/1992 | Stengel ...................... 340/7.33 |
| 5,148,548 A | * | 9/1992 | Meche et al. ................ 455/514 |
| 5,197,084 A | | 3/1993 | Fuhrman |
| 5,319,797 A | * | 6/1994 | Salter et al. ........... 340/825.72 |
| 5,499,388 A | | 3/1996 | Song |
| 5,532,683 A | | 7/1996 | Kondo |
| 5,555,451 A | | 9/1996 | Kennedy et al. |
| 5,790,952 A | * | 8/1998 | Seazholtz et al. ......... 455/432.1 |
| 5,867,776 A | | 2/1999 | Noda |
| 5,940,746 A | | 8/1999 | Otting et al. |
| 5,970,105 A | * | 10/1999 | Dacus ......................... 375/344 |
| 6,021,314 A | | 2/2000 | Magana et al. |
| 6,049,294 A | | 4/2000 | Cho |
| 6,169,761 B1 | * | 1/2001 | Marcoccia et al. .......... 375/132 |
| 6,246,867 B1 | | 6/2001 | Jakobsson |
| 6,256,477 B1 | * | 7/2001 | Eidson et al. .............. 455/63.3 |
| 6,898,415 B2 | * | 5/2005 | Berliner et al. ............ 455/63.1 |
| 7,099,638 B2 | * | 8/2006 | Lyons et al. .............. 455/166.1 |
| 2002/0071478 A1 | * | 6/2002 | Cornwall et al. ........... 375/132 |
| 2004/0013166 A1 | * | 1/2004 | Goodings .................... 375/131 |

FOREIGN PATENT DOCUMENTS

| | | |
|---|---|---|
| EP | 0599330 A1 | 6/1994 |
| JP | 110251944 A | 9/1999 |
| JP | 2001144660 A | 5/2001 |
| WO | WO 02/49888 A1 | 6/2002 |

OTHER PUBLICATIONS

Nelson et al. "Secondary standard for PM and AM noise at 5,10,and 100Mhz" IEEE vol. 42, No. 2 Apr. 1993.*

* cited by examiner

*Primary Examiner*—Temesghen Ghebretinsae
(74) *Attorney, Agent, or Firm*—Brooks Kushman P.C.

(57) ABSTRACT

A remote transmitter system for vehicle applications includes a remote transmitter for carrying by a user and a receiver for mounting on a vehicle and receiving an amplitude modulated signal. The transmitter is operative to transmit the amplitude modulated signal at a plurality of different carrier frequencies. The receiver is programmed to select the carrier frequency for reception by detecting noise due to unwanted frequency modulated signals based on a received signal strength indicator, and detecting noise due to unwanted amplitude modulated signals based on a data decoder. The receiver changes the selected carrier frequency when either noise becomes excessive.

9 Claims, 3 Drawing Sheets

REMOTE TRANSMITTER SYSTEM AND METHOD

BACKGROUND OF THE INVENTION

1. Field of the Invention

The present invention relates to remote transmitter systems and methods for vehicle applications and to interference reduction in communications systems.

2. Background Art

Remote transmitter systems are used in a number of vehicle applications. For example, remote keyless entry (RKE) systems allow a remote transmitter to be carried by a user and a receiver mounted in the vehicle to receive the transmitted signal and in response, lock or unlock the vehicle, etc. A remote keyless entry (RKE) system for the automotive market or any other communications system that uses radio frequencies to transmit information from one location to another without using wires is susceptible to interference from other radio frequency communications systems. If the interference is high enough, communication between the transmitter and receiver can be degraded severely.

Some existing radio frequency communications systems and methods are described in U.S. Pat. Nos. 4,387,469; 5,197,084; 5,499,388; 5,532,683; 5,555,451; 5,867,776; 5,940,746; 6,021,314; 6,049,294; 6,246,867; and 6,256,477. Although some existing remote transmitter systems and methods have been commercially successful, there is a need for an improved remote transmitter system and method for vehicle applications.

SUMMARY OF THE INVENTION

It is, therefore, an object of the present invention to provide an improved remote transmitter system and method that automatically switches from one frequency to another if interference is detected.

In carrying out the above object, a remote transmitter system for vehicle applications is provided. The system comprises a remote transmitter for carrying by a user and a receiver for mounting on a vehicle. The remote transmitter is operative to transmit an amplitude modulated signal at a plurality of different carrier frequencies. The receiver receives the amplitude modulated signal. The receiver is configured to receive the amplitude modulated signal at a selectable carrier frequency. The receiver includes a received signal strength indicator and a data decoder. The receiver is programmed to select the carrier frequency by detecting noise due to unwanted frequency modulated signals based on the received signal strength indicator, detecting noise due to unwanted amplitude modulated signals based on the data decoder, and changing the selected carrier frequency when either noise becomes excessive.

In a preferred embodiment, the receiver includes a phase locked loop circuit for selecting the carrier frequency. And, the transmitted amplitude modulated signal is on-off keyed.

The transmitter may be configured to transmit the amplitude modulated signal at the plurality of different carrier frequencies at the same time. Alternatively, the transmitter may be configured to transmit the amplitude modulated signal at the plurality of different carrier frequencies sequentially.

Further, in carrying out the present invention, a remote transmitter method for vehicle applications is provided. The method comprises transmitting an amplitude modulated signal at a plurality of different carrier frequencies, selecting a carrier frequency, and receiving the amplitude modulated signal at the selected carrier frequency. The method further comprises detecting noise due to unwanted frequency modulated signals based on a received signal strength at the selected carrier frequency, and detecting noise due to unwanted amplitude modulated signals based on a decoded data stream at the selected carrier frequency. The selected carrier frequency is changed when either noise becomes excessive.

In a preferred embodiment, the transmitted amplitude modulated signal is on-off keyed. The amplitude modulated signal may be transmitted at the plurality of different carrier frequencies at the same time. Alternatively, the amplitude modulated signal may be transmitted at the plurality of different carrier frequencies sequentially.

The above object and other objects, features, and advantages of the present invention are readily apparent from the following detailed description of the preferred embodiments when taken in connection with the accompanying drawings.

DETAILED DESCRIPTION OF THE PREFERRED EMBODIMENT

Figure 1:
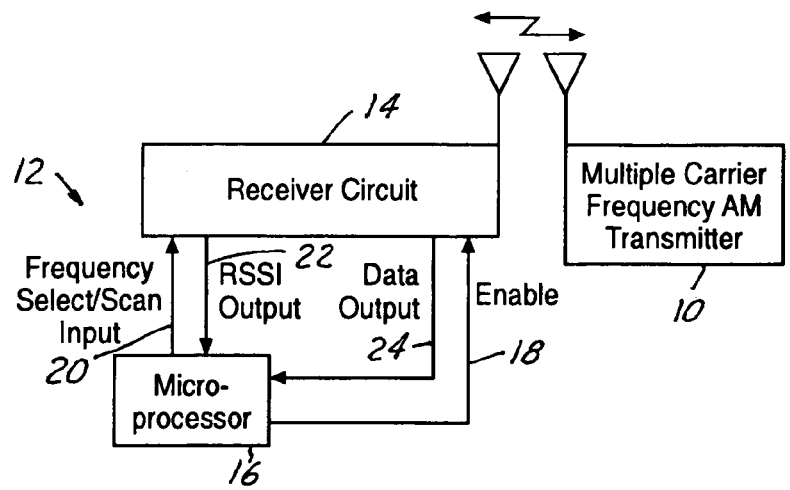
FIG. 1 illustrates a preferred embodiment of a remote transmitter system of the present invention.

FIG. 1 illustrates a remote transmitter system for vehicle applications. The system includes a remote transmitter 10 for carrying by a user and a receiver 12 for mounting on a vehicle. Remote transmitter 10 is operative to transmit an amplitude modulated signal at a plurality of different carrier frequencies. Transmitter 10 transmits an amplitude modulated signal that is on-off keyed. Receiver 12 includes receiver circuit 14 and microprocessor 16. Receiver 12 receives the amplitude modulated signal at a selectable carrier frequency. Receiver 12 includes an enable input 18, a frequency select (or scan) input 20, a received signal strength indicator output 22, and a data output 24. Microprocessor 16 is programmed to select the carrier frequency of receiver circuit 14 via frequency select input 20. The selection is made based on microprocessor 16 detecting noise due to unwanted frequency modulated signals based on the received signal strength indicator output 22 and detecting noise due to unwanted amplitude modulated signals based on the data decoder output 24. The selected carrier frequency is changed when either noise (frequency modulation or amplitude modulation) becomes excessive.

Figure 2:
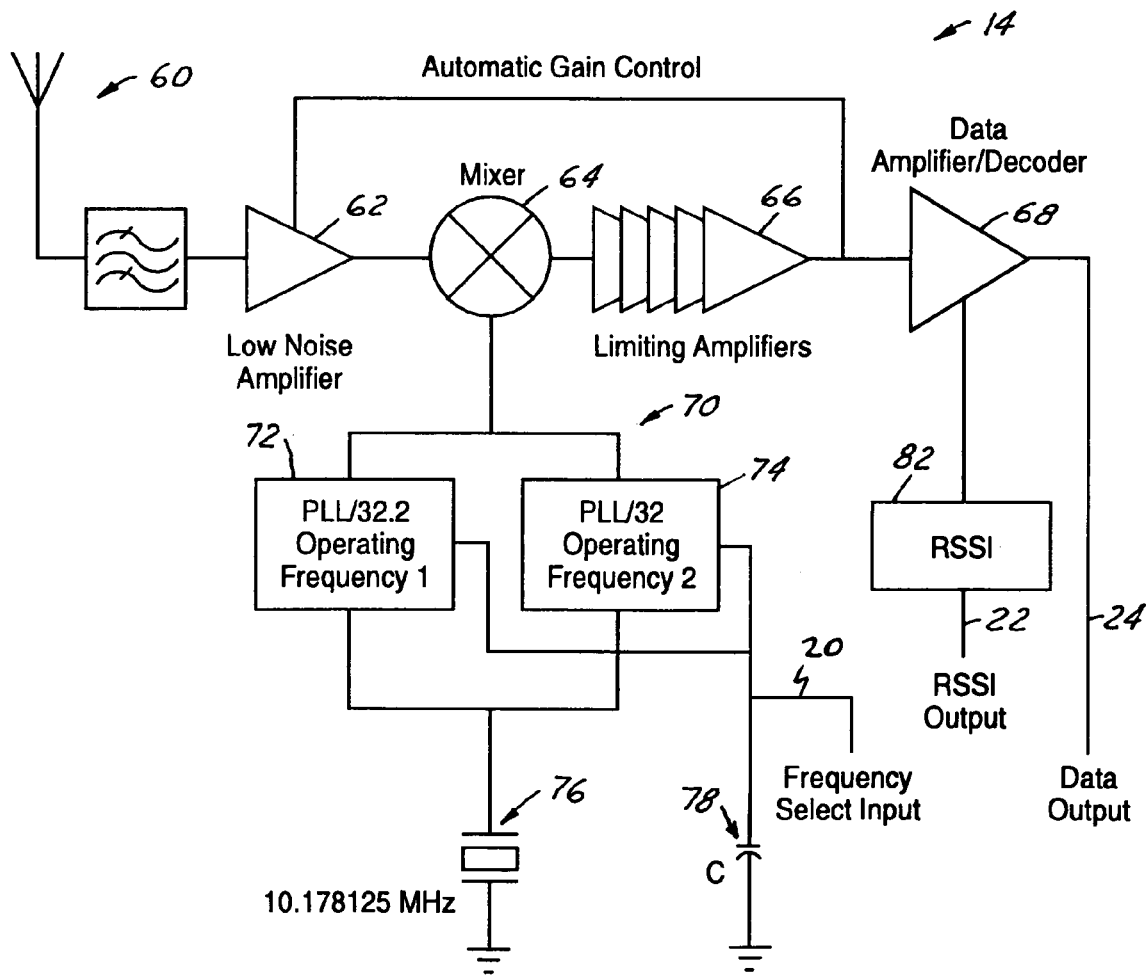
FIG. 2 illustrates the receiver circuit of the remote transmitter system of FIG. 1.

FIG. 2 illustrates receiver circuit 14 in more detail, and shows the use of a phase locked loop circuit for selecting the carrier frequency. As shown, antenna 60 provides a received signal to low noise amplifier 62 which has an output received by mixer 64. Mixer 64 downmixes the signal and provides an output to limiting amplifier 66. The output of limiting amplifier 66 provides automatic gain control to low noise amplifier 62. The output of limiting amplifier 66 is provided to data amplifier/decoder 68. Data amplifier/decoder 68 decodes the amplified iitermediate frequency signal using any suitable technique such as envelope detection. The downmixing at mixer 64 determines which carrier frequency is downmixed to the required intermediate frequency. Specifically, the phase locked loop circuit 70 provides an input to mixer 64 that differs from the desired carrier frequency by the required intermediate frequency. As shown, PLL/32.2 block 72 provides a frequency of about 327.7 MHZ to the input of mixer 64, while PLL/32 block 74 provides an input signal at 325.7 MHZ to mixer 64. If the intermediate frequency for receiver circuit 14 is 10.7 MHZ, PLL/32.2 block 72 is used to tune the receiver to 317 MHZ, while PLL/32 block 74 is used to tune the receiver to 315 MHZ. That is, frequency select input 20 may select the carrier signal as either 315MHZ or 317 MHZ. Crystal 76 provides stability for the input signal to the PLL devices, while capacitor 78 is used together with frequency select input 20 for operation frequency select.

Data amplifier/decoder 68 receives the intermediate frequency signal resulting from downmixing of the selected carrier frequency, and provides the decoded data stream to received signal strength indicator block 82 and data output 24. Received signal strength indicator block 82 provides received signal strength indicator output 22. As mentioned above, microprocessor 16 monitors RSSI output 22 and data output 24, and based on these outputs, controls frequency select input 20 to select the desired carrier frequency.

Figures 3, 4:
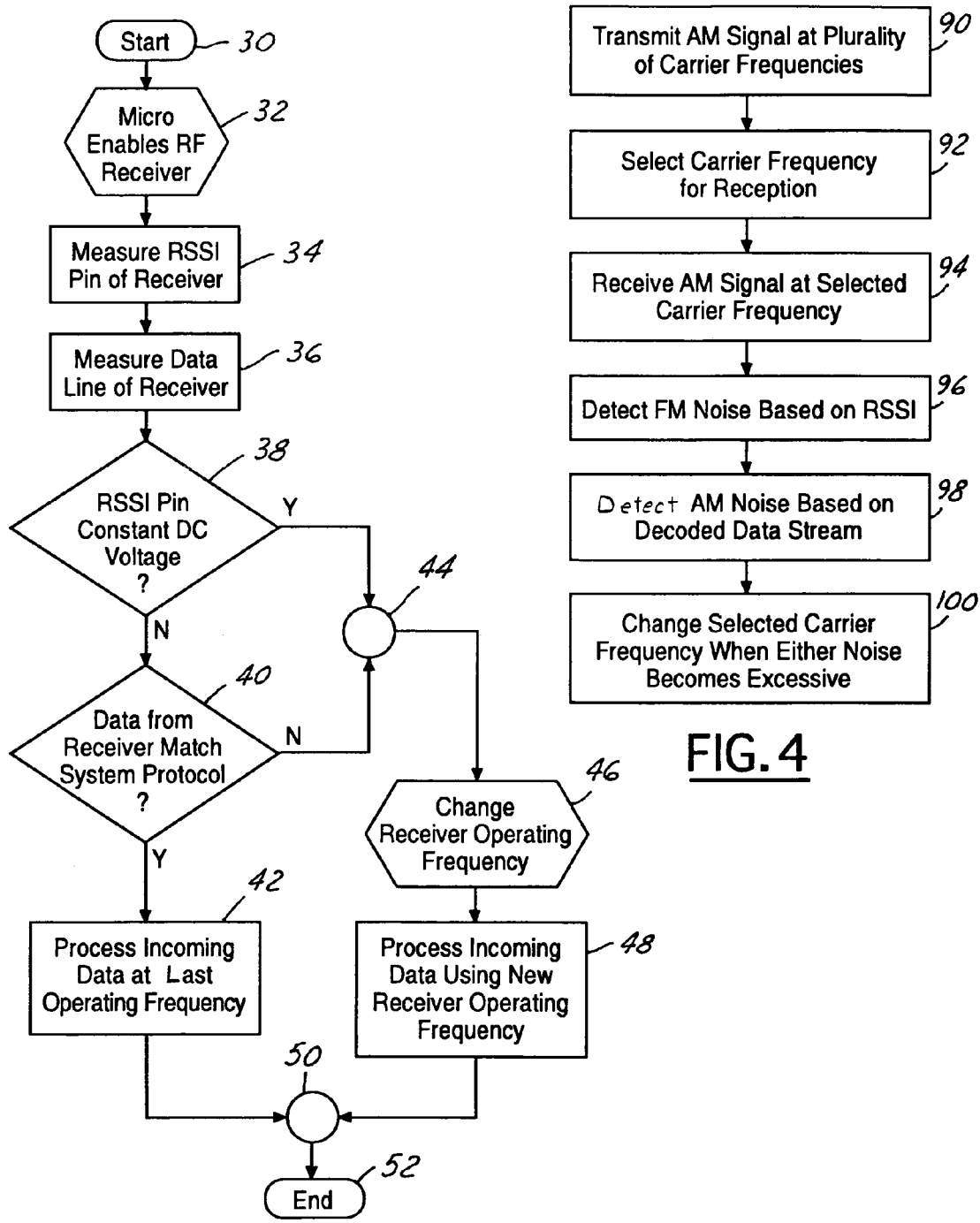
FIG. 3 illustrates a flow chart of a preferred embodiment of a remote transmitter method of the present invention.
FIG. 4 illustrates a block diagram of a method of the present invention.

FIG. 3 illustrates a preferred embodiment of a method of the present invention. Flow starts at block 30 and microprocessor 16 enables receiver circuit 14 at block 32. At block 34, RSSI output pin 20 of receiver circuit 14 is measured. At block 36, data output 24 of receiver circuit 14 is measured. One type of interference signal from another communications system that could interfere with operation of the remote transmitter system of FIGS. 1 and 2 usually is generated from a pager, cell phone, or some other frequency modulation communication. When receiver circuit 14 is enabled by microprocessor 16, RSSI output 22 is sampled by the analog to digital converter of microprocessor 16 (block 34). If microprocessor 16 determines that there is an interference signal that could degrade communications between transmitter 10 and receiver 12, microprocessor 16 instructs the receiver circuit 14 to switch to another operating frequency. Microprocessor 16 determines that there is interference by measuring the direct current (DC) voltage of the RSSI output 22 of receiver circuit 14. A constant DC voltage on the RSSI output indicates FM noise.

Another communication system that could interfere with operation of the remote transmitter of FIGS. 1 and 2 is amplitude modulation communication. This type of noise is detected by microprocessor 16 by sampling data output 24 from receiver circuit 14 (block 36). If the data coming from receiver circuit 14 is not the same type as the data microprocessor 16 expects, microprocessor 16 will instruct receiver circuit 14 to switch to another frequency.

That is, microprocessor 16 enables the receiver and changes operating frequencies when excessive AM or FM noise is detected. Block 38 indicates detection of FM noise by looking for a constant DC voltage at the RSSI output. Block 40 indicates detection of AM noise by checking if the data from the receiver circuit matches the system protocol. In the presence of either FM or AM noise that is excessive, flow proceeds through connector 44 to block 46 where the receiver operating frequency is changed as described previously, by changing the input to frequency select input 20. At block 48, incoming data is processed using the new receiver operating frequency. At block 42, when neither FM nor AM noise is excessive, incoming data is processed at the last operating frequency. Flow proceeds through connector 50 to block 52.

Remote transmitter systems and methods of the present invention are non-coherent in that there is no timing between the transmitter and receiver. For this reason, transmitter 10 sends data messages over multiple frequencies at the same time or sends a single data message at one of the operating frequencies and then a second message at a different operating frequency and so on.

FIG. 4 illustrates a block diagram of a method of the present invention. At block 90, an AM signal is transmitted at a plurality of carrier frequencies, either sequentially or simultaneously. At block 92, a carrier frequency is selected for reception. At block 94, an AM signal is received at the selected carrier frequency. At block 96, FM noise is detected based on the received signal strength indicator. At block 98, AM noise is detected based on the decoded data stream. At block 100, the selected carrier frequency is changed when either FM or AM noise becomes excessive.

Figure 5:
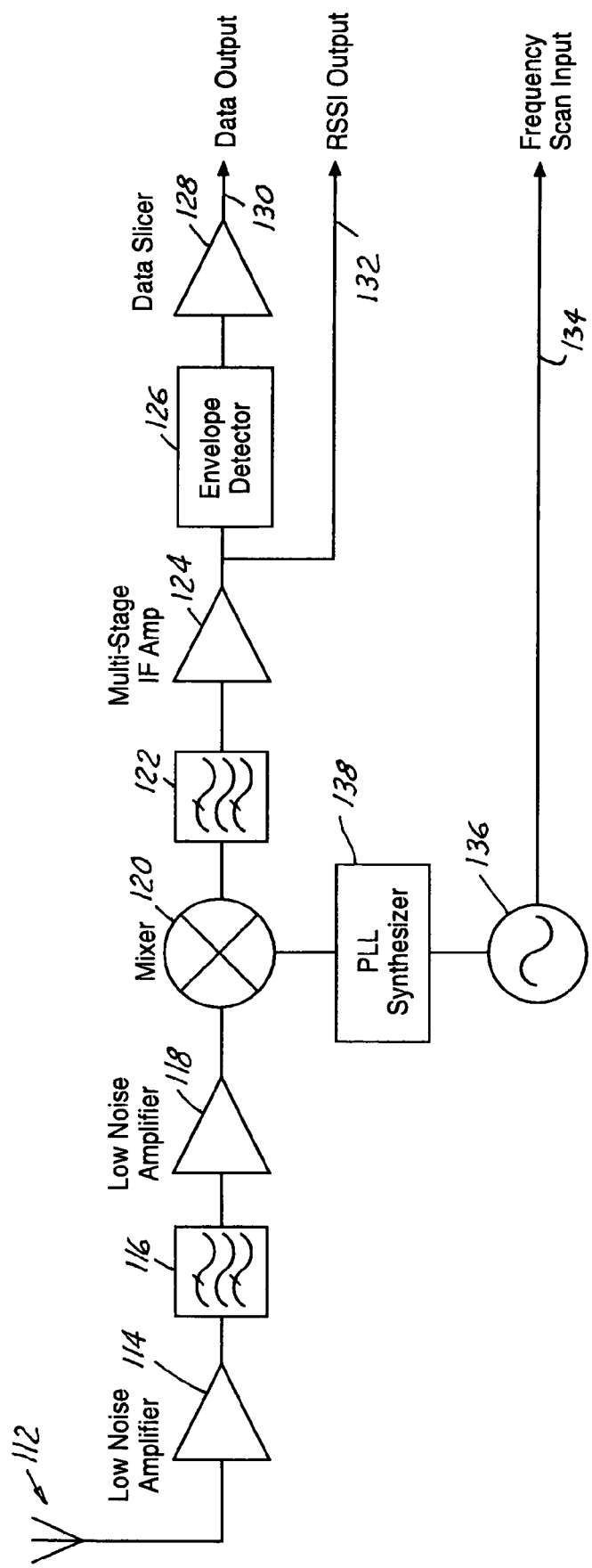
FIG. 5 illustrates an alternative receiver circuit for the remote transmitter system of FIG. 1.

FIG. 5 illustrates an alternative receiver circuit 110 in detail, and shows the use of a phase locked loop circuit and an electrically tunable crystal oscillator for selecting the carrier frequency. The crystal oscillator includes electrically tunable capacitors to allow the microprocessor to sweep. As shown, antenna 112 provides a received signal to low noise amplifier 114 which has an output that is passed through carrier frequency pre-selector filter 116 and low noise amplifier 118 to mixer 120. Mixer 120 downmixes the signal and provides an output to intermediate frequency filter 122. The output of intermediate frequency filter 122 is provided to multi-stage intermediate frequency amplifier 124, envelope detector 126 and data slicer 128 to provide amplification and decoding of the intermediate frequency signal to produce data output 130. The downmixing in mixer 120 determines which carrier frequency is downmixed to the required intermediate frequency. Specifically, the phase locked loop circuit 138 provides an input to mixer 120 that differs from the desired carrier frequency by the required intermediate frequency. Crystal oscillator 136 is electrically tunable. That is, frequency scan input 134 may select the carrier signal, and the microprocessor may sweep through a range of frequencies.

Multi-stage intermediate frequency amplifier 124 receives the intermediate frequency signal resulting from downmixing of the selected carrier frequency. As mentioned above, microprocessor 16 monitors data output 130 and RSSI output 132, and based on these outputs, controls frequency scan input 134 to select the desired carrier frequency by electrically tuning crystal oscillator 136.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A remote transmitter system for vehicle applications, the system comprising:

a remote transmitter for carrying by a user, the remote transmitter being operative to transmit an amplitude modulated signal at a plurality of different carrier frequencies; and a receiver for mounting on a vehicle and receiving the amplitude modulated signal wherein the receiver is configured to receive the amplitude modulated signal at a selectable carrier frequency, the receiver including a received signal strength indicator and a data decoder, the receiver being programmed to select the carrier frequency by detecting noise due to unwanted frequency modulated signals when the received signal strength indicator provides a constant direct current (DC) voltage, detecting noise due to unwanted amplitude modulated signals when the data decoder provides data that is of an unexpected type, and changing the selected carrier frequency when either noise becomes excessive.

2. The system of claim 1 wherein the receiver includes a phase locked loop circuit for selecting the carrier frequency.

3. The system of claim 1 wherein the transmitted amplitude modulated signal is on-off keyed.

4. The system of claim 1 wherein the transmitter is configured to transmit the amplitude modulated signal at the plurality of different carrier frequencies at the same time.

5. The system of claim 1 wherein the transmitter is configured to transmit the amplitude modulated signal at the plurality of different carrier frequencies sequentially.

6. A remote transmitter method for vehicle applications, the method comprising:

transmitting an amplitude modulated signal at a plurality of different carrier frequencies;

selecting a carrier frequency;

receiving the amplitude modulated signal at the selected carrier frequency;

detecting noise due to unwanted frequency modulated signals when a received signal strength at the selected carrier frequency is a constant;

detecting noise due to unwanted amplitude modulated signals based-on when a decoded data stream at the selected carrier frequency is of an unexpected type;

changing the selected carrier frequency when either noise becomes excessive.

7. The method of claim 6 wherein the transmitted amplitude modulated signal is on-off keyed.

8. The method of claim 6 wherein transmitting further comprises:

transmitting the amplitude modulated signal at the plurality of different carrier frequencies at the same time.

9. The method of claim 6 wherein transmitting further comprises:

transmitting the amplitude modulated signal at the plurality of different carrier frequencies sequentially.

* * * * *